United States Patent [19]

Iwata et al.

[11] Patent Number: 5,041,923
[45] Date of Patent: Aug. 20, 1991

[54] DATA STORAGE CASE HAVING A WRITE/PROTECT ASSEMBLY

[75] Inventors: Hirokimi Iwata, Ibaragi; Shuji Haruna, Tokyo, both of Japan

[73] Assignee: Sony Corporation, Tokyo, Japan

[21] Appl. No.: 449,749

[22] Filed: Dec. 13, 1989

[30] Foreign Application Priority Data

Dec. 29, 1988 [JP] Japan .................... 63-170820[U]

[51] Int. Cl.$^5$ ............................................. G11B 15/04
[52] U.S. Cl. ...................................... 360/60; 360/133
[58] Field of Search .................... 360/60, 133, 132

[56] References Cited

U.S. PATENT DOCUMENTS

| | | |
|---|---|---|
| 4,012,011 | 3/1977 | Saito . |
| 4,530,017 | 7/1985 | Oishi et al. . |
| 4,536,812 | 8/1985 | Oishi et al. . |
| 4,549,240 | 10/1985 | Hodges . |
| 4,618,060 | 10/1986 | Tarter . |
| 4,805,061 | 2/1989 | Champagne ............. 360/60 X |
| 4,908,725 | 3/1990 | Iwahashi ................. 360/60 X |

FOREIGN PATENT DOCUMENTS

| | | |
|---|---|---|
| 0185364 | 12/1985 | European Pat. Off. . |
| 0206897 | 6/1986 | European Pat. Off. . |
| 1501075 | 2/1978 | United Kingdom . |

*Primary Examiner*—A. J. Heinz
*Attorney, Agent, or Firm*—Lewis H. Eslinger; Jay H. Maioli

[57] ABSTRACT

A data storage case having a write/protect assembly includes a main body of the cartridge, a plurality of detection holes formed in the lateral side and on two flat sides of the main body of the cartridge adjacent a corner of the front side of the main body of the cartridge relative to the direction of insertion of the main body of the cartridge into the interior of the recording/reproducing apparatus, and mating detection elements inserted into these detection holes. The main body of the cartridge accommodates a disk-shaped recording medium, on which information signals can be recorded, and has apertures through which the signal recording section of the disk-shaped recording medium is exposed to outside. The mating detection elements may be moved between a first position and a second position within the detection holes.

9 Claims, 5 Drawing Sheets

DATA STORAGE CASE HAVING A WRITE/PROTECT ASSEMBLY

BACKGROUND OF THE INVENTION

1. Field of the Invention

This invention relates to a data storage case having a write protect assembly. This invention more specifically relates to a disk cartridge, having a recording medium, such as a disk-shaped recording medium, including an optical disk, a magneto-optical disk or a magnetic disk, accommodated in a container, such as a cartridge and having a movable device therein for indicating the write or protect state of the recording medium.

2. Description of the Background

There has so far been utilized a disk cartridge which is comprised of a disk, such as an optical disk or a magneto-optical disk, which is accommodated within a cartridge, and on which are recorded information signals, such as data signals or video signals.

This type of the disk cartridge, such as is shown in U.S. Pat. No. 4,460,930, is provided with a write/protect member which the recording medium protects from inadvertent erasure of previously recorded information signals, which is caused by a mistaken recording operation on the disk. This write/protect member is movably provided within the cartridge. By moving the write/protect member, the mating detection elements provided at the write/protect member so as to be detected by the write/protect detection assembly provided on the recording and/or reproducing apparatus on which the disk cartridge is mounted may be selectively moved between the first and the second positions within the detection hole in the cartridge. With the mating detection elements in the first position, recording of the information signals on the recording medium is inhibited, whereas, with the mating detection elements in the second position, recording of information signals on the recording medium is enabled. Thus, the write/protect detection assembly on the recording and/or reproducing apparatus detecting that the mating detection elements of the write/protect member are in the first or the second position results in the selection of whether the recording operation may or may not be made by the recording and/or reproducing apparatus.

Meanwhile, the conventional write/protect assembly provided on the disk cartridge accommodating an optical or a magneto-optical disk on which information signals can be recorded is so designed and constructed that the mating detection elements of the write/protect member face that flat side or surface of the main body of the cartridge which is confronted by the signal recording surface of the disk and into which is intruded the disk driving apparatus of the recording and/or reproducing apparatus.

With the recording and/or reproducing apparatus supporting a disk cartridge provided with a write/protect assembly, in which the mating detection elements of the write/protect member are exposed only on the flat side of the main body of the cartridge, constraints are imposed on the mounting position of the write/protect detection assembly. Above all, with the disk cartridge in which the mating detection elements are exposed only the side or surface of the main body of the cartridge into which the disk driving apparatus is intruded when the disk cartridge is attached to the recording and/or reproducing apparatus, the write/protect detection assembly need be provided in the vicinity of the disk driving apparatus. With the optical recording and/or reproducing device, an optical pickup apparatus is provided on the side of the recording and/or reproducing apparatus on which the disk driving apparatus is mounted. However, there is not sufficient space for the write/protect detection assembly on the side of the apparatus where various other devices are mounted simultaneously. Thus it becomes difficult to get the write/protect detection assembly incorporated into the recording and/or reproducing apparatus, so that constraints are imposed on the arrangement of the various devices of the recording and/or reproducing apparatus and hence difficulties are raised in connection with designing. Also, inasmuch as there is not sufficient space on the side of the apparatus where the disk driving apparatus is provided, constraints are imposed on the lead-out position of the lead wires for outputting detection signals from the write/protect detection assembly and hence difficulties are also presented in assembling.

On the other hand, when the mating detection elements are provided for facing only the surface into which the disk driving apparatus is intruded, the write/protect detection assembly is provided on the same side of the disk cartridge as the disk driving apparatus. Thus the write/protect state of the recording cannot be detected unless the disk cartridge is attached at a predetermined position to the recording and/or reproducing apparatus. Hence, when information signals are recorded, or when a disk cartridge for which recording is inhibited is inserted erroneously, not only prompt exchange of the disk cartridge cannot be made, but the apparatus or the disk cartridge may be injured due to forced manipulation of the recording and/or reproducing apparatus.

OBJECTS AND SUMMARY OF THE INVENTION

It is therefore an object of the present invention to provide a write/protect assembly for a recording medium accommodating apparatus enabling not only the detection of write/protect from only one surface of the main body of the cartridge but also the detection of write/protect from a plurality of surfaces.

It is another object of the present invention to provide a write/protect assembly for a recording medium accommodating apparatus in which detection of recording protection from a plurality of surfaces of the container is rendered possible to eliminate the constraints on the mounting position of the write/protect detection assembly provided in the recording and/or reproducing apparatus to facilitate the designing of the recording and/or reproducing apparatus.

It is still another object of the present invention to provide a write/protect assembly for a recording medium accommodating apparatus which enables quick detection of protect recording in association with the attachment operation to the recording and/or reproducing apparatus of the recording medium accommodating apparatus, such as the disk cartridge.

For accomplishing the above objects, the present invention provides a write/protect assembly for a recording medium accommodating apparatus comprising a container accommodating a recording medium on which information signals can at least be recorded, a plurality of detection holes formed in one lateral surface and at least one major surface of said container, and a write/protect member provided in said container, said write/protect member including a plurality of mating detection elements, said mating detection elements being movable between first and second positions within said detection holes.

With the write/protect assembly for the recording medium accommodating apparatus according to the present invention, since the write/protect member is provided so that its mating detection elements are exposed to the detection holes formed in one lateral surface and at least one major surface of a container accommodating a recording medium, detection of write/protect may be made at least from the lateral surfaces and one major surface of the container.

The above and other objects and advantages of the present invention will be become apparent from the following description of the present invention especially when read in conjunction with the accompanying drawings.

DETAILED DESCRIPTION OF THE PREFERRED EMBODIMENTS

The present invention will be explained with reference to an embodiment in which the present invention is applied to a disk cartridge comprised of an optical disk for recording information signals and a cartridge accommodating the optical disk.

Figure 1:
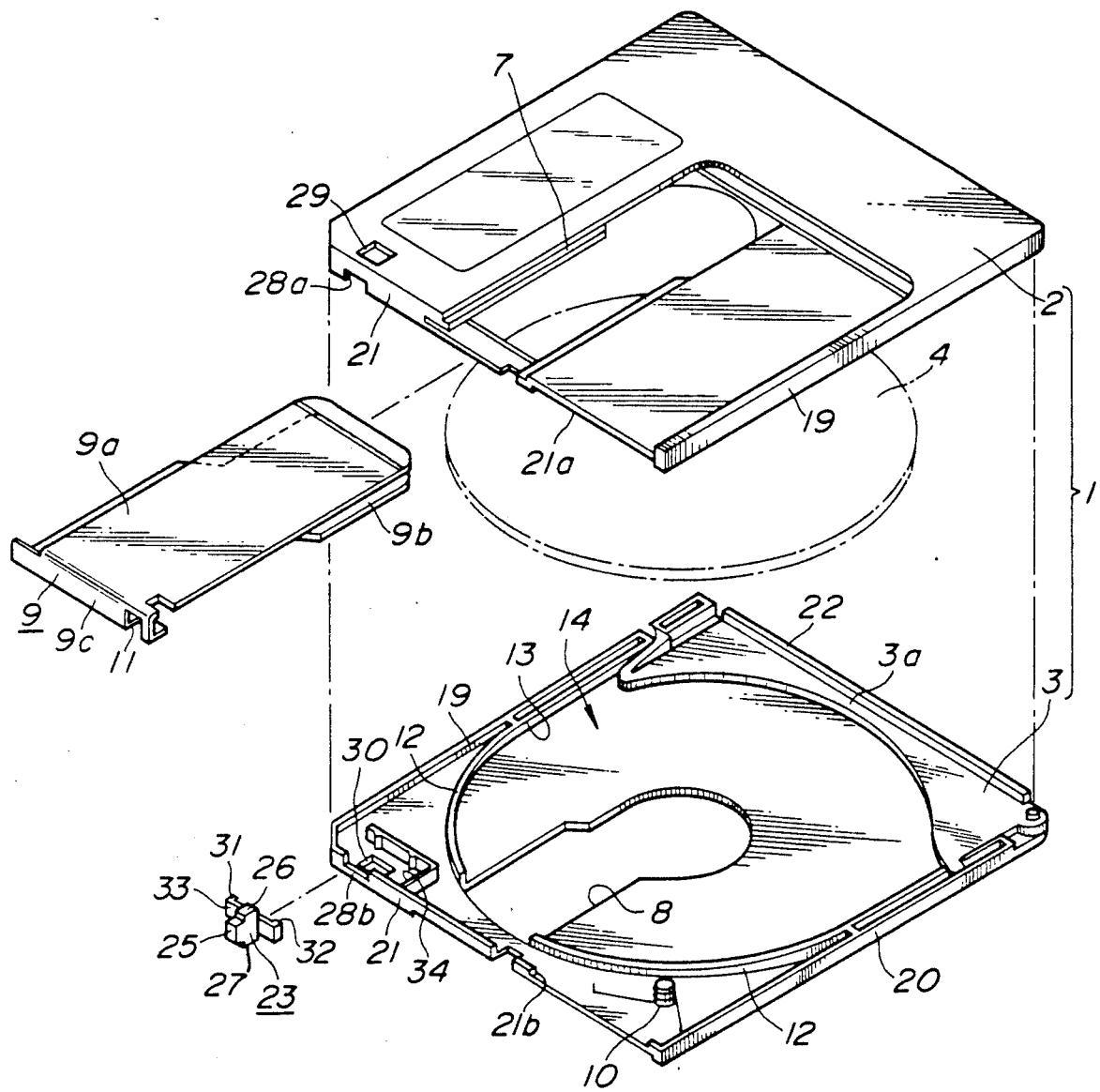
FIG. 1 is an exploded perspective view of a disk cartridge according to the present invention.
Figure 2:
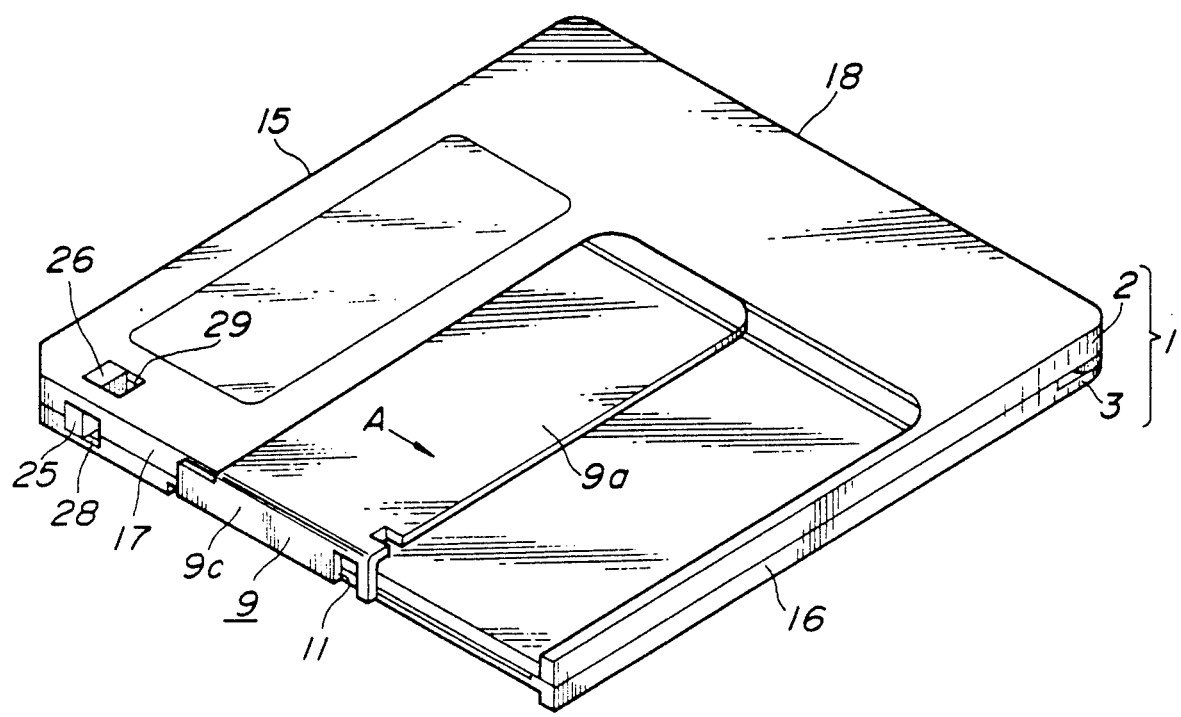
FIG. 2 is a perspective view as seen from the upper surface of the disk cartridge.
Figure 3:
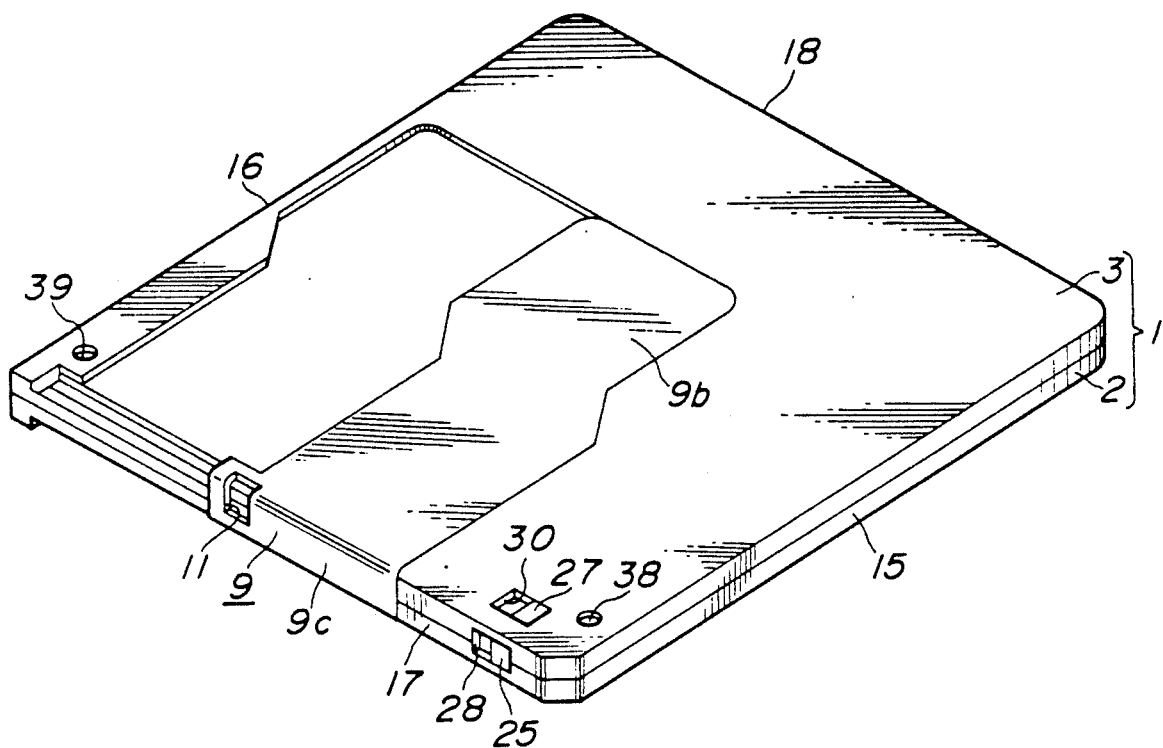
FIG. 3 is a perspective view as seen from the lower surface of the disk cartridge.

As shown in FIGS. 1 to 3, the disk cartridge according to the present invention is comprised of a main body of the cartridge 1 formed by an upper half 2 and a lower half 3, each in the form of a rectangular flat plate formed by molding synthetic resin, abutted and secured to each other, and an optical disk 4 adapted to record information signals, such as data signals, and rotatably accommodated within the main body of the cartridge 1. Extending from the central portions towards the forward edges of the upper half 2 and the lower half 3 constituting the main body of the cartridge 1 are rectangular openings 7 and 8 through which a chucking section provided at the center of the optical disk 4 accommodated therein and the signal recording surface of the optical disk 4 are exposed to outside and which are faced by information signal recording/reproducing means adapted to perform recording of information signals on the optical disk 4 and reproduce previously recorded information signals from the optical disk 4. The upper and the lower halves 2, 3 are rectangular in profile to form the main body of the cartridge 1 together. To the main body 1 is connected an opening/closing plate 3a so as to be rotated rearwards for opening and/or closing a disk insertion/removal opening formed in the side wall of the main body 1.

To the main body 1, there is slidably mounted a shutter 9 for opening or closing the apertures 7 and 8. This shutter 9 is formed by bending a metal plate, such as a stainless steel plate, so as to be U-shaped in cross-section, and is comprised of a first closure surface section 9a for closing the aperture 7 in the upper half 2, a second closure surface section 9b for closing the aperture 8 in the lower half 3 and a connecting section 9c interconnecting the first and the second closure surface sections 9a, 9b. As shown in FIGS. 2 and 3, this shutter 9 is fitted from the front side over the outer surfaces of the main body 1, so that the first and second surface sections 9a, 9b will overlie the apertures 7, 8 formed in the flat sides of the upper and the lower halves 2 and 3, and is mounted to slide along the flat sides of the main body 1. This shutter 9 is slidingly biased by a torsion spring 10 provided at one corner on the front side of the main body 1 in a direction of closing the apertures 7 and 8. For opening the shutter 9, an operating pin, not shown, provided on the recording/reproducing apparatus for engaging in an engaging opening 11 formed at one end of the connecting section 9c, is actuated in the direction shown by an arrow A in FIG. 2. Thus the shutter 9 is moved from a position of closing the apertures 7, 8 to a position towards the lateral side of the main body 1 for opening the apertures 7, 8.

On the inner side of the upper and lower halves 2 and 3 constituting the main body of the cartridge 1, there are formed arcuate ribs 12 from the rear-side corners towards the front side, as shown in FIG. 1, for defining a substantially circular recess on each half 2, 3, each recess having the inside diameter slightly larger than the outside diameter of the optical disk 4. These recesses 13 face each other and the arcuate ribs 12 abut to each other to form a disk housing section 14 surrounded by circumambient walls.

On the mutually abutting lateral sides of the upper and the lower halves 2 and 3, where the front sides engage with the shutter 9, and the rear sides are opposite to the front sides, there are formed upstanding walls 19, 20, 21 and 22 forming side walls 15, 16, a front wall 17 and a rear wall 18 when the walls 19 to 22 are abutted one against the other. The portion of the front wall 17 through which the shutter 9 is moved is to be opened to permit the movement of the torsion spring 10 urging the shutter 9. To this end, there are formed grooves 21a, 21b in the walls 21, 21 of the upper and the lower halves 2 and 3 forming the front wall 17 of the main body of the cartridge 1 for defining the opened portion.

In the vicinity of the front side of the main body 1, engaged by the shutter 9, and at one of the corners of the main body 1 out of the range of movement of the shutter 9, there are formed first, second and third detection holes 28, 29, 30 into which are fitted first, second and third mating detection elements 25, 26, 27 of a write/protect member 23. As shown in FIGS. 2 and 3, the first detection hole 28 is formed in a portion of the front wall 17 of the main body of the cartridge 1 which is not covered by the shutter 9. For forming the first detection hole 28, there are formed grooves 28a, 28b in the upstanding walls 21, 21 of the upper and lower halves 2 and 3 forming the front wall 17. The second detection hole 29 is formed in the upper half 2 forming the upper surface of the main body 1 orthogonal to the front wall 17, whereas the third detection hole 30 is formed in the lower half 3 forming the lower surface of the main body 1 in register with the second detection hole 29. Thus the first to third detection holes 28, 29, 30 are formed in the three different sides of the main body of the cartridge 1. The first to third detection holes 28, 29, 30 are of such a size as will permit the first to third mating detection elements 25 to 27 to be moved between first and second positions within their respective detection holes.

Figure 4:
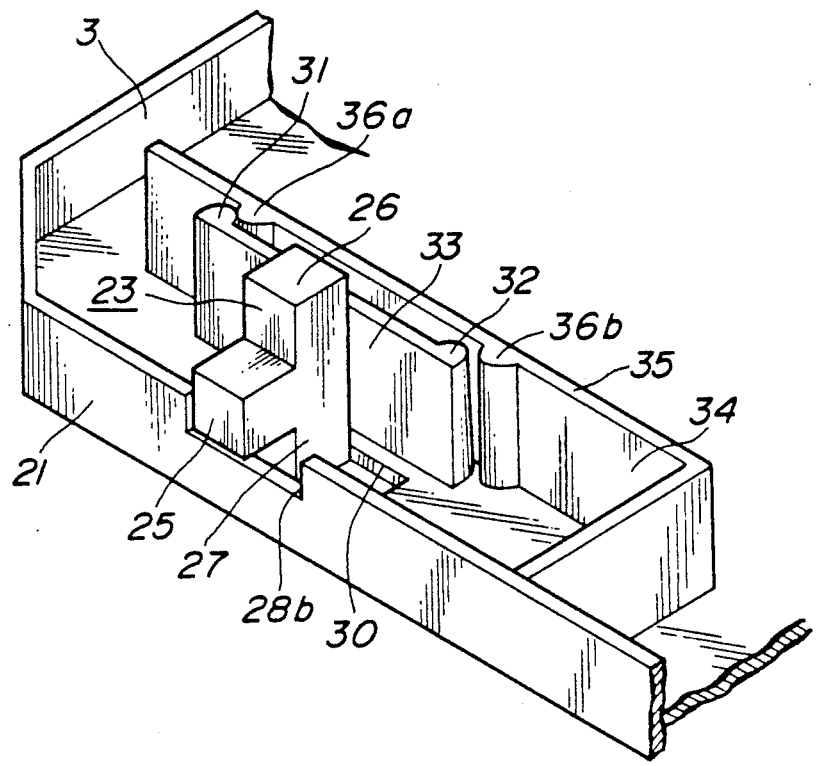
FIG. 4 is a partial perspective view showing the write/protect member on the disk cartridge.

As shown in FIG. 4, the write/protect member 23 is formed integally by the first to third mating detection elements 25 to 27. These first to third mating detection elements 25 to 27 are designed to be received in the first to third detection holes 28 to 30 when the write/protect member 23 is mounted in position within the main body of the cartridge 1. Thus the first mating detection element 25 is projected at right angles from the vertically continuous second and third mating detection elements 26, 27. On the proximal side of the write/protect member 23 opposite to the projecting first mating detection member 25, there is provided a resiliently deflectible slide guide 33 having retention end ribs 31, 32.

Figure 5:
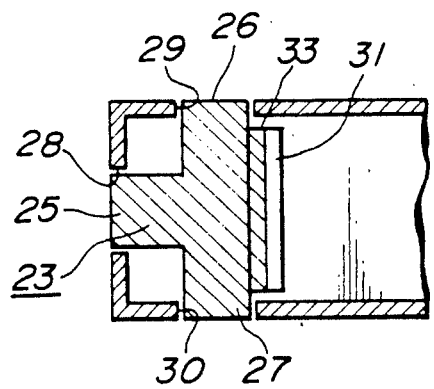
FIG. 5 is a partial cross-sectional view showing a mounting portion of the write/protect member.

The above described write/protect member 23 is fitted into an engaging recess 34 formed in the lower half 3 so that the first to third mating detection elements 25, 26, 27 fit into the first to third detection holes 28, 29, 30, respectively, as shown in FIG. 5. The engaging recess 34 is of such a size as to movably support the write/protect member 23 to permit the first to third mating detection elements 25 to 27 to be moved between the first and the second positions within the first to third detection holes 28 to 30. The write/protect member 23 is attached within the engaging recess 34 in the lower half 3, with the third mating detection member 27 engaging in the third detection hole 30 and with the slide guide 33 pressed against a rear side wall 35 of the engaging recess 34. On the rear wall 35, there are formed a pair of mating retention ribs 36a, 36b selectively engaged by the retention ribs 31, 32 when the first to third mating detection elements 25 to 27 are moved between the first and the second positions within the first to third detection holes 28 to 30, respectively. The write/protect member 23 is caused to slide for selectively engaging the retention ribs 31, 32 with one or the other sides of the mating retention ribs 36a, 36b for selectively holding the first to third mating detection elements 25 to 27 at the first or the second position within the first to third detection holes 28 to 30.

When the upper half 2 is abutted against the lower half 3, to which the write/protect member 23 is attached as described hereinabove, the main body of the cartridge 1 is completed, with the first to third mating detection elements 25 to 27 intruding into the respective first to third detection holes 28 to 30, as shown in FIGS. 2 and 3. The write/protect member 23 is moved by manually thrusting any one of the first to third mating detection elements 25 to 27 for selectively shifting the first to third mating detection elements 25 to 27 to the first position towards one side of the first to third detection holes 28 to 30 or to the second position towards the other side of the detection holes 28 to 30. Thus it may be indicated from the variable positions of the first to third mating detection elements 25 to 27 within the first to third detection holes 28 to 30 whether the disk cartridge is in the recording enable state or in the recording inhibit state.

On both front side corners of the lower half 3 of the main body 1 are formed positioning holes 38, 39, into which are engaged positioning pins, not shown, for positioning the disk cartridge when the disk cartridge is mounted in position in a disk mounting section within the recording/reproducing apparatus, as shown in FIG. 3. The write/protect member 23 is provided in the vicinity of the positioning hole. Thus, as shown in FIG. 6, the disk cartridge may be positioned accurately by a detection device 100 including a detection switch 101 provided on the recording/reproducing apparatus when the disk cartridge is attached to the recording/reproducing apparatus.

Figure 6:
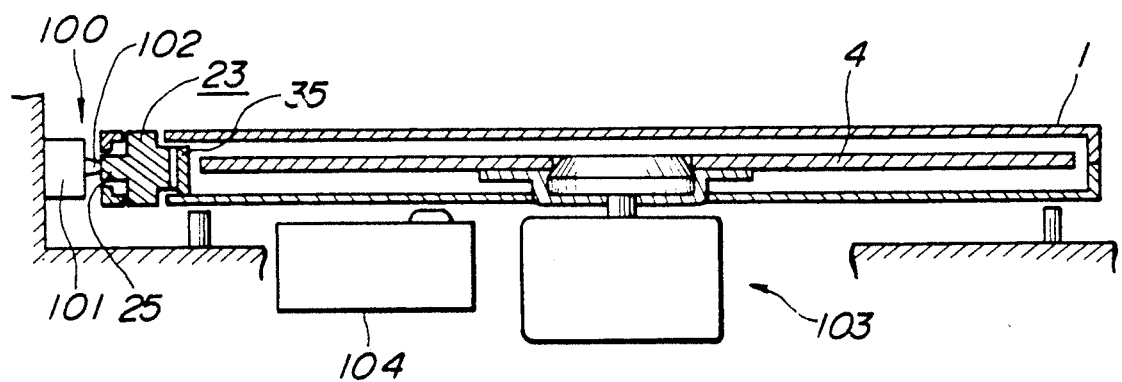
FIG. 6 is a diagrammatic side elevation for explaining the relative disposition of the detection device provided on the recording and/or reproducing apparatus and the write/protect member.

The detection device 100 provided on the recording/reproducing apparatus includes the detection switch 101 having an operating portion 102 and is so designed that actuation or non-actuation of the operating portion is an indication of whether the disk cartridge 1 is or is not in the recording enable state, as shown in FIG. 6.

Since the write/protect member 23 is disposed at the front wall 17 of the main body 1 and on the two major surface of the main body of the cartridge 1 orthogonal to the front wall 17, the detection switch 101 of the detection device 100 may be provided on the side of the recording and/or reproducing apparatus which is free of the disk driving device 103 for rotationally driving the disk 4 in the main body 1 or the optical pickup 104 for recording and/or reproducing information signals. Thus the detection switch 101 may be arranged at a position facing the front wall 17 of the main body, corresponding to the first detection element 25 as shown in FIG. 6.

Figure 7:
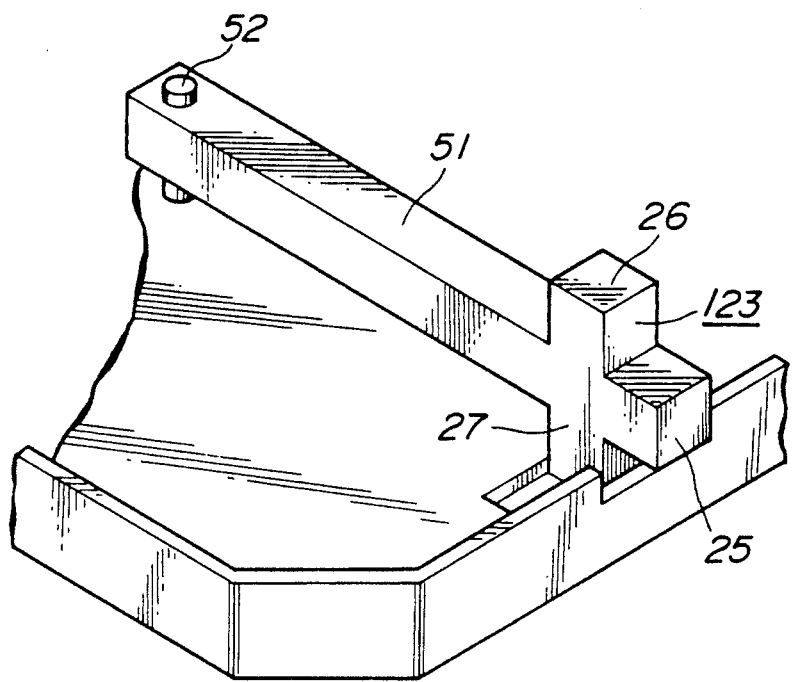
FIG. 7 is a partial perspective view showing the mounting state of a write/protect member according to a modification of the present invention.

Although the write/protect member 23 is slidably mounted on the main body of the cartridge 1, it may also be mounted thereon rotatably, as shown in FIG. 7. A write/protect inhibit member 123 is provided with a rotary arm 51 on the proximal side of the first to third mating detection elements 25 to 27 and rotatably mounted by having the proximal end of the arm 51 pivotally mounted by a pivot pin 52 implanted on the lower half 3. The rotary write/protect member 123 is rotated by thrusting any one of the first to third mating detecting elements 25 to 27 for changing the position of the first to third mating detection elements 25 to 27 within the first to third detection holes 28 to 30 for indicating whether the disk cartridge is in the record enable or record inhibit state.

Figure 8:
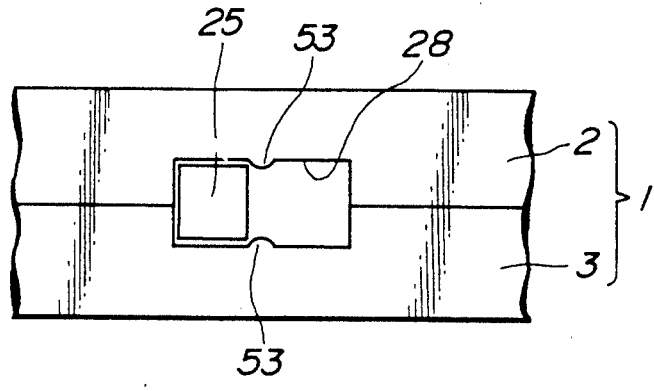
FIG. 8 is a partial front view showing the detection hole confronted by the mating detection elements of the write/protect member.

With the above described rotary type write/protect member 123, a movement control boss 53 is provided within at least one of the first to third detection holes 28 to 30, as shown in FIG. 8, for maintaining or defining the first and second positions of the first to third mating detection elements 25 to 27 within the first to third detection holes. The mating detection elements 25 to 27, when moved, are caused to ride over the control boss 53.

With the above described disk cartridge, the first to third mating detection elements 25 to 27 of the write/protect member 23 are disposed on the three different sides of the main body of the cartridge 1, so that the write-protect member 23 may be mounted without regard to the mounting position of the detection device provided on the recording/reproducing apparatus.

Meanwhile, with the above described disk cartridge, it is necessary to slide the shutter 9 to open the apertures 7, 8 before the disk cartridge is mounted in position within the recording/reproducing apparatus. Consequently, this type of disk cartridge is attached to the recording/reproducing apparatus from the front side fitted with the shutter 9. By providing the write/protect member 23 on the front side of the disk cartridge, fitted with the shutter, the position of one or more of the first to third mating detection elements 25 to 27 may be detected during attachment of the disk cartridge to the recording/reproducing apparatus. Above all, with the reproducing/reproducing apparatus in which attachment of the disk cartridge is performed with the aid of a cartridge holder, the detection device may be provided within the cartridge holder to permit prompt detection of mistaken recording.

In the above described embodiment, the write/protect member 23 is provided on the front side of the main body of the cartridge 1. However, it may also be provided at the rear side corner opposite to the front side fitted with the shutter 9. In such case, the write/protect 23 member may be mounted without regard to the mounting position of the detection device 100 provided on the recording/reproducing apparatus.

The mating detection elements 25 to 27 may be mounted for detection through either the front wall 17, side wall 15 or 16 or the rear wall 18 and through one major surface of the main body of the cartridge 1, so that the detection device may be positioned at least on the side not provided with the disk rotation and driving apparatus to simplify the structure of the disk rotation and driving apparatus.

Although the above description relates to a disk cartridge accommodating a disk-shaped recording medium, the present invention may also be applied to a cartridge accommodating a tape-shaped recording medium, such as magnetic tape, with the operation and result comparable with that of the above described embodiment.

According to the present invention, the feasibility of the data signal recording operation on the recording medium such as an optical disk, enclosed in an enclosure, such as a cartridge, may be detected from one lateral surface and a major surface of the container normal to the lateral surface so that constraints of the mounting position of the write/protect detection assembly provided on the recording/reproducing apparatus are eliminated to facilitate the designing of the recording/reproducing apparatus.

Also, by providing the mating detection elements on the front side of the enclosure, prompt detection of the mistaken write/protect may be made in association with the attachment of the disk cartridge or the like enclosure for the recording medium to the recording/reproducing apparatus.

What is claimed is:

1. A data storage case having a write/protect assembly comprising:
    a main body having two major flat sides and lateral sides forming a container for accommodating in an interior thereof a recording medium on which information signals can at least be recorded,
    a plurality of detection holes formed respectively in at least one of the lateral sides and in said two major flat sides of said main body at a front corner of said main body relative to the direction of insertion of the data storage case into a recording and/or reproducing apparatus, and
    a write/protect member movably arranged in said main body, said write/protect member including a plurality of mating detection elements corresponding in number to said plurality of detection holes with each detection element extending into and residing within a respective detection hole, said mating detection elements being movable together between first and second positions within respective ones of said plurality of detection holes.

2. A data storage case having a write/protect assembly according to claim 1 wherein a first of said mating detection elements engages said detection hole formed in said lateral side of said main body for facing outward relative to said interior and second and third ones of said mating detection elements engage a respective second and third one of said mating detection holes formed in said two major flat sides of said main body for facing outwards relative to said interior, said first and second mating detection elements being at right angles with each other.

3. A data storage case having a write/protect assembly according to claim 1 wherein
    one of said plurality of mating detection elements comprises a first mating detection element engaging in said detection hole formed in said lateral side of said main body for facing outwards relative to said interior and others of said plurality of mating elements comprise a second and third mating detection element engaged respectively in said detection holes formed in said two major flat sides of said main body for facing outwards relative to said interior, said first mating detection element being at right angles with said second and third mating detecting elements.

4. A data storage case having a write/protect assembly comprising
    a main body having two major surfaces and lateral surfaces for accommodating in an interior thereof a recording medium on which information signals can at least be recorded,
    a plurality of detection holes formed in at least one lateral surface and at least one major surface of said main body, and
    a write/protect member movably arranged in said main body, said write/protect member including a plurality of mating detection elements, said mating detection elements being movable together between first and second positions within respective ones of said plurality of detection holes, and wherein said write/protect member is located within a recess formed in said interior of said main body and wherein a slide guide formed on said write/protect member is pressed against a rear wall of said recess relative to a direction of insertion of the data storage case in to a recording and/or reproducing apparatus, and said slide guide is arranged on a side of said write/protect member opposite to the side provided with said mating detection elements and includes spaced-apart retention ribs, wherein corresponding mating retention ribs are provided in said recess for being selectively engaged by said retention ribs on said slide guide.

5. A data storage case having a write/protect assembly comprising;
    a main body having two major surfaces and lateral surfaces for accommodating in an interior thereof a recording medium on which information signals can at least be recorded, a plurality of detection holes formed in a at least one lateral surface and at least one major surface of said main body, and a write/protect member movably arranged in said main body, said write/protect member including a plurality of mating detection elements, said mating detection elements being movable together between first and second positions within respective ones of said plurality of detection holes, wherein said write/protect member is attached to one end of a rotary arm, the other end of said rotary arm is rotatably mounted on a pin provided in said main body and wherein a movement control boss is formed in at least one of said detection holes.

6. A data storage case having a write/protect assembly according to claim 8, wherein said detection holes are provided on at least one of said lateral surfaces and on at least one of said major surfaces of said main body adjacent a corner on a front side of said main body relative to the direction of insertion of said data storage case into a recording and/or reproducing apparatus.

7. A data storage case having a write-protect assembly according to claim 6, wherein a first or said mating detection elements engages said detection hole formed in said lateral surface of said main body for facing outward relative to said interior and a second of said mating detection elements engages a second of said mating detection holes formed in at lest one of said major surfaces of said main body for facing outward relative to said interior, said first and second mating detection elements being at right angles with each other.

8. A data storage case having a write/protect assembly according to claim 6, wherein said detection holes are formed in said lateral surface of said main body and in two of said major surfaces of said main body.

9. A data storage case having a write/protect assembly according to claim 8, wherein one of said plurality of mating detection elements comprises a first mating detection element engaging in said detection hole formed in said lateral surface of said main body for facing outward relative to said interior and others of said plurality of mating elements comprise second and third mating detection elements engaged respectively in said detection holes formed in said two major surfaces of said main body for facing outward relative to said interior, said first mating detection element being at right angles with said second and third mating detection elements.

* * * * *

UNITED STATES PATENT AND TRADEMARK OFFICE
CERTIFICATE OF CORRECTION

PATENT NO. : 5,041,923

DATED : August 20, 1991

INVENTOR(S) : Hirokimi Iwata, Shuji Haruna

It is certified that error appears in the above-identified patent and that said Letters Patent is hereby corrected as shown below:

Col. 1, line 8, change "write protect" to --write/protect--
line 24, change "the recording medium protects" to --protects the recording medium--
line 65, after "only" insert --on--

Col. 4, line 38, after "recess" insert --13--

Col. 6, line 24, change "surface" to --surfaces--

Col. 7, line 10, change "reproducing" first occurrence, to --recording--

Col. 7, line 56, change ":" to --;--

UNITED STATES PATENT AND TRADEMARK OFFICE
CERTIFICATE OF CORRECTION

PATENT NO. : 5,041,923

DATED : August 20, 1991

INVENTOR(S) : Hirokimi Iwata, Shuji Haruna

It is certified that error appears in the above-identified patent and that said Letters Patent is hereby corrected as shown below:

```
Col. 8, line 26, after "and" insert --a--
        line 32, change "detecting" to --detection--
Col. 9, line 1, delete "a" second occurrence
        line 16, change "8" to --5--
Col. 10, line 3, change "lest" to --least--
```

Signed and Sealed this

Twenty-third Day of February, 1993

Attest:

STEPHEN G. KUNIN

*Attesting Officer*   *Acting Commissioner of Patents and Trademarks*